United States Patent [19]

Long

[11] 4,095,770
[45] Jun. 20, 1978

[54] TILTABLE SEAT FOR TRACTOR AND THE LIKE

[76] Inventor: Daniel C. Long, 14314 Hamilton, Riverview, Mich. 48192

[21] Appl. No.: 737,612

[22] Filed: Nov. 1, 1976

[51] Int. Cl.² .............................................. B60N 1/02
[52] U.S. Cl. .................................... 248/371; 297/314
[58] Field of Search .............. 297/314, 347, 355, 385; 248/371

[56] References Cited

U.S. PATENT DOCUMENTS

| | | | |
|---|---|---|---|
| 1,039,004 | 9/1912 | Young | 297/314 |
| 1,326,943 | 1/1920 | McManis | 297/385 |
| 2,270,233 | 1/1942 | Shaw | 297/347 |
| 2,572,910 | 10/1951 | Brown | 248/371 X |
| 3,021,107 | 2/1962 | Salo | 297/314 X |
| 3,240,529 | 3/1966 | Boulsover | 297/347 X |
| 3,315,934 | 4/1967 | Taylor | 297/314 X |
| 3,448,820 | 6/1969 | Aiello et al. | 297/314 X |
| 3,533,658 | 10/1970 | Gropp | 297/355 |
| 3,713,617 | 1/1973 | Bogdan et al. | 248/371 |
| 3,741,511 | 6/1973 | Streeter | 248/371 |

*Primary Examiner*—Francis K. Zugel
*Attorney, Agent, or Firm*—Harness, Dickey & Pierce

[57] ABSTRACT

The present invention embodies a seat cushion and base which are made of metal and have oppositely disposed triangular plates attached thereto and connected by pivot pins which are axially aligned on the center of the cushion and base forming a hinge arrangement. This permits the lateral tilting of the seat cushion when the vehicle is tilted thereby maintaining the cushion in normal horizontal position. A pair of rams are disposed between the base and the cushion connected by a hydraulic line which conducts fluid from one ram to the other when the load of the occupant shifts due to the vehicle tilting to have the high side of the cushion move downwardly to maintain it in horizontal position.

2 Claims, 3 Drawing Figures

TILTABLE SEAT FOR TRACTOR AND THE LIKE

BACKGROUND OF THE INVENTION

Reference may be had to a number of patents, which were uncovered in a search for self-leveling seats, for a disclosure of the prior art.

U.S. Pat. No. 2,939,512, Pohl, June 7, 1960
U.S. Pat. No. 3,315,934, Taylor, Apr. 25, 1967
U.S. Pat. No. 3,341,165, Taylor, Sept. 12, 1967
U.S. Pat. No. 3,466,089, Stueckle, Sept. 9, 1969
U.S. Pat. No. 3,542,423, Lawrence, Nov. 24, 1970
U.S. Pat. No. 3,583,758, Radford, June 8, 1971
U.S. Pat. No. 3,670,834, Rogers, June 20, 1972

SUMMARY OF THE INVENTION

The seat unit of the present invention is mountable on construction machinery such as vans or other types of vehicles to provide stability for the driver by maintaining the cushion of the seat horizontal at all times. Should the vehicle be driven along the side of a bank causing it to tilt, the seat cushion will automatically maintain a horizontal position to provide stability for the vehicle operator. The cushion of the seat is of a conventional form and may be constructed in a manner to have a pan-like base containing a foam rubber pad which is covered by upholstery material. The bottom of the pan has a pair of supporting plates of V-shape attached thereto with the apex pivotally connected to inverted V-shaped plates which are preferably mounted on the base on a pair of tracks for forward and rearward adjustment of the seat unit. To maintain stability to the seat cushion and prevent it from tilting freely from side to side, a pair of pivoted rams are secured on the base with the piston rods sloping upwardly and outwardly and connected to the underside of the cushion.

The bottom of the rams, below the pistons, are joined by flexible hydraulic lines in which a gate valve is provided which may be shut off or be opened to any desired degree. A reservoir is connected in the conduit circuit for supplying oil or other make-up fluid to the system. When the gate valve is closed, the seat is prevented from tilting, and when opened to a desired amount, the displacement of the center of gravity of the occupant of the seat causes the high side to move down and the low side to move up. This movement is caused by the passage of the fluid from the bottom of one ram to the bottom of the other ram to thereby redistribute the load and maintain the cushion in a horizontal plane. When the vehicle again is moved to level ground, the weight of the occupant on the high side of the cushion will again cause it to move downwardly into a horizontal plane which would be normal to the vertical plane on the vehicle.

DESCRIPTION OF THE PREFERRED EMBODIMENT

Figure 1:
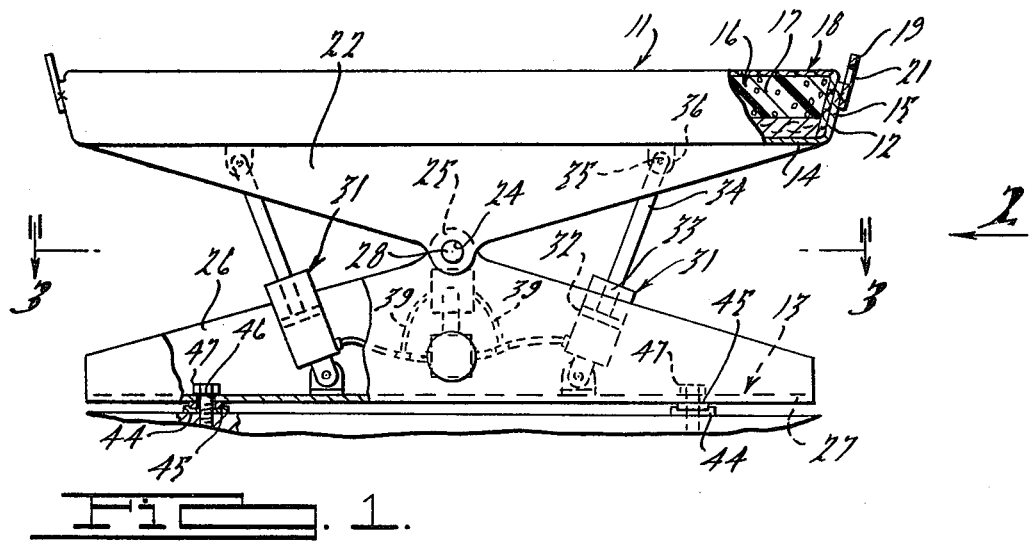
FIG. 1 is a view in elevation of the front of the seat, with a portion of the cushion shown in section, embodying features of the present invention.

As illustrated in the drawing, a seat 11 has a cushion 12 and a base portion 13 disposed one above the other. The cushion 12 has a metal pan 14 with sides 15 in which a cushion unit 16 is secured. The cushion unit 16 is made from a foam rubber pad 17 which is enclosed within a fabric 18 and secured within the pan 14 of the seat secured in unit relation therewith. The lateral portion of the sides 15 of the seat has plates 19 welded or otherwise secured thereto having a slot 21 therethrough for a seat belt, the two portions of the seat belt permit the vehicle operator to secure himself on the cushion by connecting the tongue and buckle provided on the separable ends of the fabric belt which are secured in the slots 21 of the plates 19.

Figure 2:
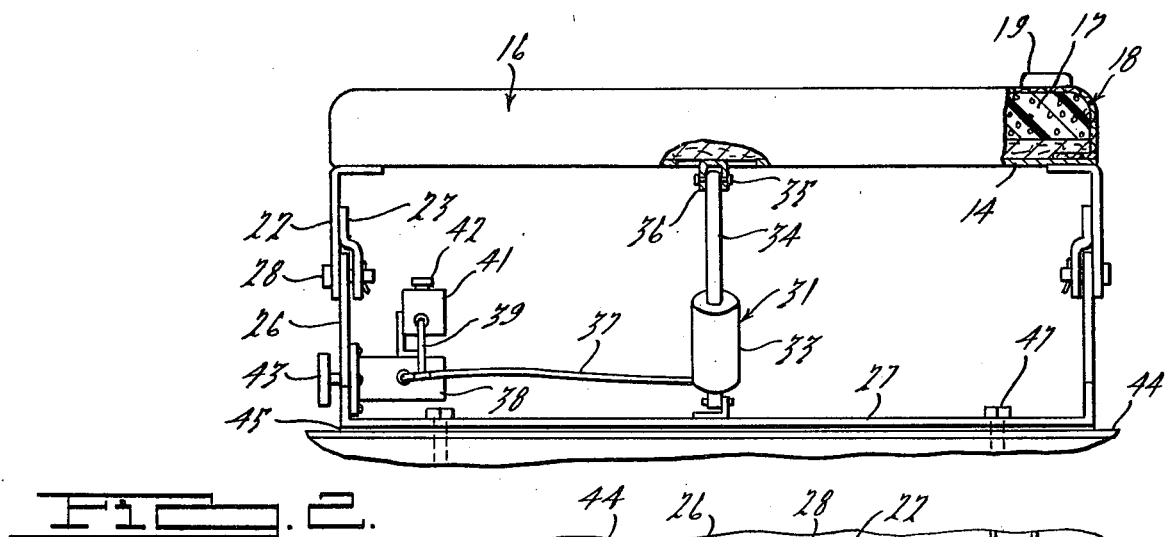
FIG. 2 is a side view of the structure illustrated in FIG. 1, with a portion of the cushion shown in section, as viewed from point 2.
Figure 3:
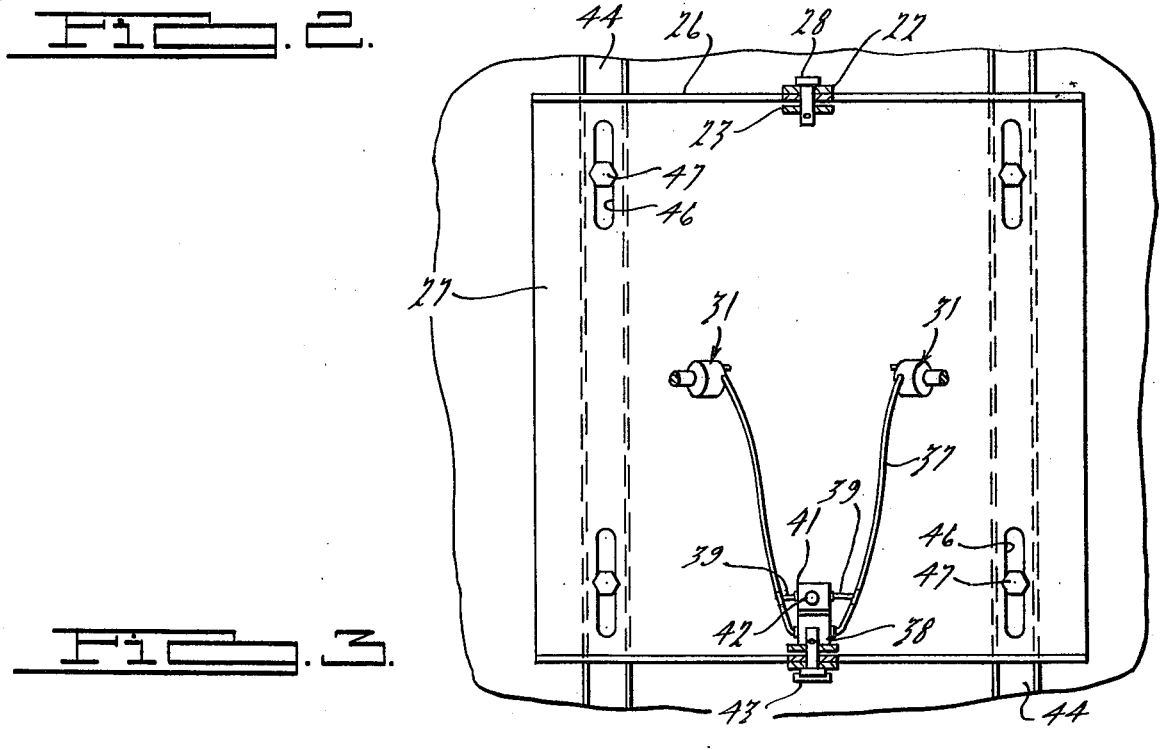
FIG. 3 is a sectional view of the structure illustrated in FIG. 1, taken on the line 3—3 thereof.

The metal base 12 of the seat is welded or otherwise secured to a pair of spaced triangular shaped flat brackets 22 which has an offset bracket 23 welded or otherwise secured thereto, as illustrated in FIG. 2. This provides a bifurcated apex with aligned openings 24 which are connected to an aligned opening in an apex extension 25 on a similar pair of brackets 26 which are welded or otherwise secured to a base plate 27. It is to be understood that other types of supports could be used besides the triangular brackets 22 and 26 for tiltably supporting the cushion unit 12 on the base 27. For example, only a single of such brackets (either 22 or 26) could be utilized with the pivot axis being adjacent either the seat base 12 or support structure of the associated vehicle. A pair of aligned pins 28 secure the two triangular brackets 22 and 26 in unit relation in a manner to permit the tilting of the cushion to the right or the left when the vehicle is tilted to the left or right. In other words, if the vehicle tilts to the left when driven along the side of an embankment, the weight of the driver will be on the right side of the cushion causing it to move downwardly and the outside of the cushion to move upwardly until it is in a horizontal plane.

This is made possible by the use of a pair of rams 30 and 31 having a hydraulic fluid, such as oil, in the bottom of a cylinder 33 below a sealed piston 32 which contacts the top of the fluid. Piston rods 34 on the pistons 32 extend from the cylinders and are connected to the bottom of the cushion by pivots 35 connected to brackets 36 extending from the bottom of the metal pan 14 of the cushion. The ends of the piston rods are preferably located midway between the fore and aft edge of the cushion toward the side edges thereof to have them slope outwardly. When the vehicle tips to the left, the weight of the occupant will shift to the right causing the right-hand side of the cushion to move downwardly and the other side to move upwardly into horizontal position. This is caused by forcing the fluid from the ram 30 to the ram 31 through the flexible hydraulic lines 37 containing a hand-operated gate valve 38 and through conduit sections 39 to a reservoir 41 which has a fill cap 42 thereon.

The gate valve 38 has a manually adjustable handle 43 by which the flow of fluid between the rams may be interrupted so as to stabilize the cushion and prevent it from tilting or which may be opened to a predetermined degree to vary the rate of flow of the fluid from one ram to the other to thereby control the reaction of the cushion to the vehicle tilt. The reservoir is preferably maintained full of oil or other hydraulic fluid so that very little, if any, air will be trapped in the circuit which could cause too much play in the fluid between the rams. It is to be understood that in place of the reservoir a connection could be made into an already existing low pressure line if one is available. By way of example, the seat construction comprises a pair of spaced mounting tracks 44 secured to the vehicle in which spaced bars 45 slide having slots 46 through which bolts 47 extend. As will be apparent, fore and aft adjustment may be made by merely loosening the bolts 47. Since the same person usually employs the seat, only one adjustment is usually needed; however, if others are to use the seat from time to time, various other types of standard automatic track adjusting mechanisms may be utilized to facilitate fast and effortless seat adjustment.

With such a seat unit design it was found that the tractor can tilt 30° either side of the vertical and have the seat cushion move to horizontal position. The seat unit has been designed to utilize standard parts which are readily securable such as the rams, the gate valve, the hydraulic conductor and the reservoir, all of which are obtainable at a nominal cost. The use of the gate valve permits an operator to preset the rate of passage of the fluid to obtain a cushion response suitable to the operator's individual preference. The resulting seat unit has special adaption for use on land reclamation, like work and for cutting grass along the highways. The use of the seat belt is advantageous since the reaction to level the cushion comes from the shift in the center of gravity of the person occupying the cushion to which the belt is attached.

The seat above described is a necessity on today's construction machinery. It affords operators far greater comfort and much safer riding by giving him a seat that will move with him and not just with the machine. Current safety laws require the use of seat beits for construction machinery which, if of a non-tilting design, will cause a great deal of stress and discomfort by strapping the operator in a poor seating position.

The plates 19 for the seat belt are preferably secured to the rear of the seat cushion 12 so as to have the belt engage the waist of the occupant to firmly secure him to the seat in a comfortable manner. The seat may be used on construction machinery such as crawler tractors, motor graders, motor scrapers, crawler loaders, farm tractors, commercial lawn cutting equipment, and all units that at one time or another work on other than level grades. The use of the self-leveling cushion eliminates the necessity of hanging on to some part of the vehicle when in tilted position thereby eliminating the stress on the operator's body.

Although the present invention has been disclosed herein as being specifically applicable to correcting for laterally tilting movement of a vehicle seat, it is to be noted that the present invention may also find highly satisfactory application in correcting or accommodating for forward and rearward attitude changes of a vehicle by merely changing the orientation (rotating) the entire seat assemblage by 90° from the position shown in the drawings.

What is claimed is:

1. A self-leveling, sidewardly tiltable, vehicle seat embodying a seat cushion, a support element on which said cushion is supported, triangular shaped members having the largest side secured adjacement to the forward and rearward edges of said support element with the apexes extending downwardly, a base support element having at the forward and rearward edges thereof laterally extending triangular shaped members with the apexes extending upwardly, said triangular shaped members at the forward and rearward edges of the base and cushion support elements having aligned apertures at the apexes thereof, central pivot means extending through said apertures permitting the cushion to tilt laterally when the vehicle is tilted; from the vertical, a pair of rams connected between the seat cushion and base support elements on opposite sides of said central pivot, a flexible hydraulic conduit between the bottom portion of the rams, a fluid in the conduit which passes from one bottom portion to the other bottom portion thereof when the seat cushion is tilted in either direction, reservoir means communicating with said hydraulic conduit to maintain said hydraulic conduit full of fluid, and a manual control valve in said flexible conduit which may be closed to prevent tilting of the cushion or opened to a desired degree so that when open, said fluid is caused to move at a controlled rate from one ram to the other by weight of the seat occupant to maintain the cushion in a substantially horizontal position.

2. A self-leveling, sidewardly tiltable vehicle seat as recited in claim 1, wherein track elements are provided between the base and the vehicle support area permitting the forward and rearward adjustment of the seat, said track elements having locking means.

* * * * *